April 26, 1960 J. C. TRAVILLA 2,934,028
RAILWAY VEHICLE STRUCTURE
Filed May 22, 1957 3 Sheets-Sheet 1
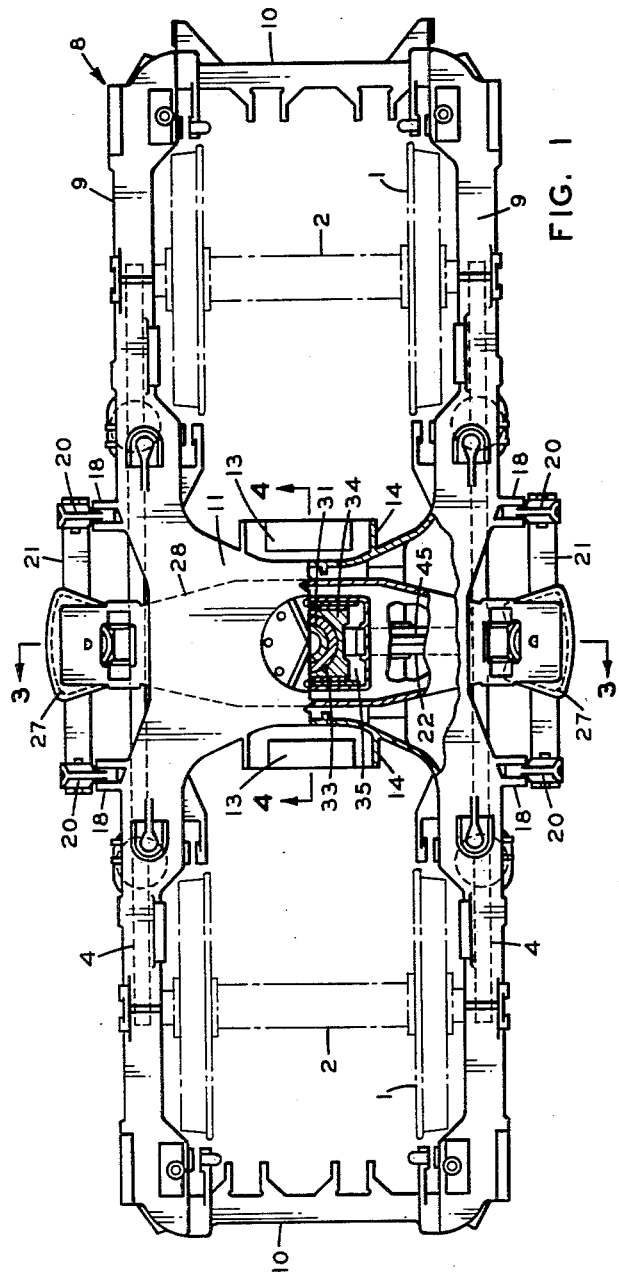
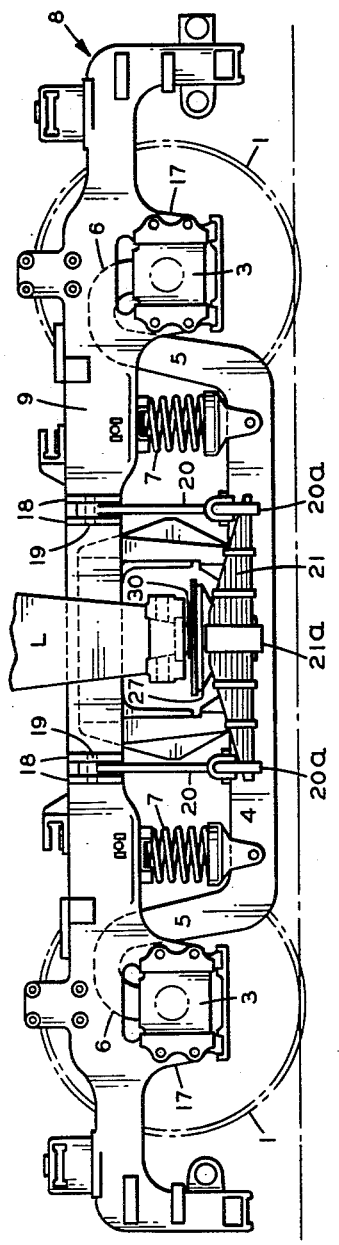
INVENTOR.
JAMES C. TRAVILLA
BY
Francis T. Burgess
ATTORNEY April 26, 1960   J. C. TRAVILLA   2,934,028
RAILWAY VEHICLE STRUCTURE
Filed May 22, 1957   3 Sheets-Sheet 2

INVENTOR.
JAMES C. TRAVILLA
BY
Francis T. Burgess
ATTORNEY

April 26, 1960     J. C. TRAVILLA     2,934,028
RAILWAY VEHICLE STRUCTURE

Filed May 22, 1957     3 Sheets-Sheet 3

INVENTOR.
JAMES C. TRAVILLA
BY
*Francis T. Burgess*
ATTORNEY

United States Patent Office 2,934,028
Patented Apr. 26, 1960

2,934,028

RAILWAY VEHICLE STRUCTURE

James C. Travilla, Ladue, Mo., assignor to General Steel Castings Corporation, Granite City, Ill., a corporation of Delaware Application May 22, 1957, Serial No. 660,859

4 Claims. (Cl. 105—199)

The invention relates to railway vehicle trucks and particularly to trucks of the type in which the vehicle body is provided with a transverse tractive effort beam which extends beneath the truck frame and is arranged with respect thereto for lateral and swiveling movement about a central vertical pivot, and is supported via loaded side bearings on the ends of a swing-motion bolster which is arranged to swivel with the truck, whereby tractive and braking forces are transmitted directly from the truck frame to the vehicle body, without passing through the bolster.

In order to prevent lateral displacement between the tractive effort beam, which is rigid with the vehicle body underframe, and the swing-motion bolster, which is restrained against any swiveling movement relative to the truck frame, so that the body will move laterally with the bolster and, at the same time, to permit the tractive effort beam to swivel relative to the swing-motion bolster, two solutions have been suggested.

The first was the provision of an auxiliary pivot pin depending from the center of the tractive effort beam and, in one embodiment, connected to the bolster through a block slidably mounted in the bolster for movement longitudinally of the truck and, in another embodiment, connected to the central portion of the bolster by a short pivoted link extending transversely of the truck. These arrangements were unsatisfactory in that, because of the provision of the main pivot between the truck frame and the tractive effort beam at a location immediately above that required for the auxiliary pivot, there would be a serious clearance problem in many trucks. Moreover in the last-mentioned embodiment, reliance is placed on a single link, which is required to function both in tension and compression depending on the direction of the lateral forces, to hold the bolster and tractive effort beam together laterally.

The second solution suggested to remedy the condition caused by the first proposed solution was the elimination of the central pivot pin between the tractive effort beam and bolster and the substitution therefor, in association with the loaded side bearings, of mating arcuate guide members concentric with the transverse centers of the bolster and tractive effort beam.

In one prior art truck arrangement the mating arcuate guide members consist of a depending flange on the tractive effort beam portion of the side bearings and a corresponding groove in the bolster portion of the side bearings, the groove being somewhat wider than the thickness of the flange so as to prevent the transmission of tractive and braking forces from the vehicle body through the tractive effort beam to the bolster. There are substantial difficulties inherent in this arrangement due, principally, to the tendency of the bolster and tractive effort beam portions of the arcuate guides to become eccentric relative to each other with resultant binding and excessive wear. Heretofore trucks of this type have been of the unequalized type, largely because of the difficulty of accommodating this type to suspension to an equalized truck.

It is accordingly a main object of the invention to provide, in a truck of this type, improved means for restraining lateral displacement of the tractive effort beam relative to the bolster.

It is a further object to provide lateral restraint means, between the tractive effort beam and bolster, which are substantially free from rapidly wearing parts.

An additional object is to provide effective lateral restraint means, between the tractive effort beam and bolster, which are spaced from the truck center and from the loading pads and which are symmetrical about the bolster and tractive effort beam centers.

A still further object is to provide an equalization system in a truck of the type described above without interfering with the normal functioning of the bolster and tractive effort beam suspension.

I achieve these and additional objects, which will appear hereinafter, by providing drop equalizers, locating the swing hangers outboard of the frame wheel pieces so as to clear the equalizers and, at the same time, increasing the distance laterally of the truck between the side bearings, recessing the wheel pieces laterally inwardly between the adjacent swing hanger brackets so as to clear the members supporting the body on the tractive effort beam, arching the bolster at the equalizer locations to clear the equalizers, and connecting the bolster and the tractive effort beam by a pair of aligned links extending transversely of the truck with their inner ends connected by resilient means to the tractive effort beam at points spaced laterally from the beam center and their outer ends connected, also by resilient means, to the bolster near its ends so as to prevent lateral displacement between the bolster and the tractive effort beam. By reason of the resilient end connections, I am able to use a pair of links symmetrically disposed with reference to the tractive effort beam center, yet secured to the tractive effort beam at points laterally spaced from the center; foreshortening of the links during swiveling movement of the tractive effort beam relative to the bolster is accommodated by the yieldability, longitudinally of the links, of the resilient end connections.

In the drawings:

Figure 1 is a top view of a truck embodying my invention partially cut away to show structure below the center transom.

Figure 2 is a side view of the same truck.

Figure 3:
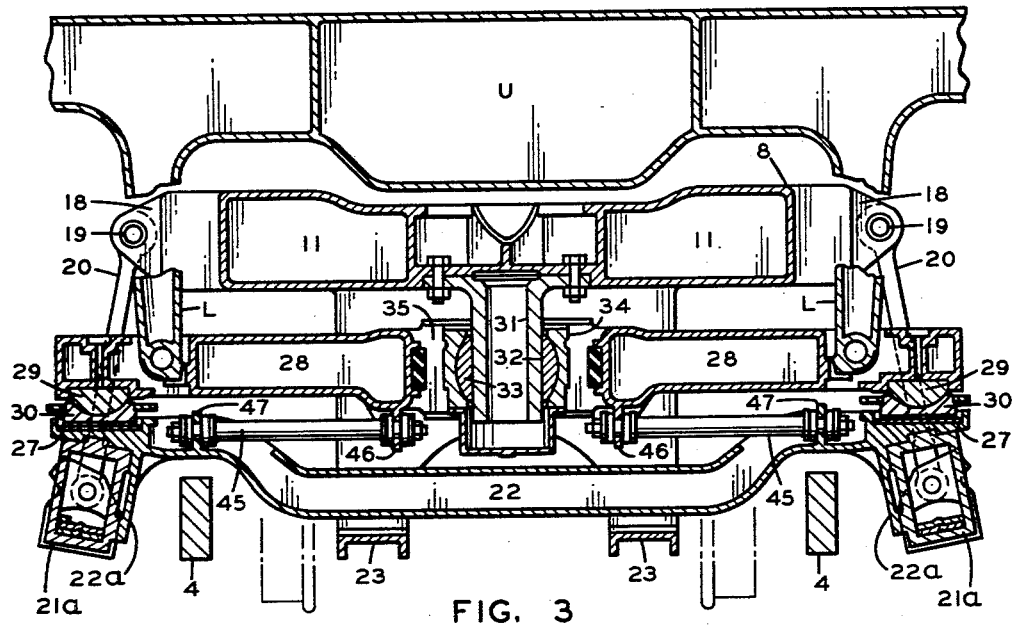
Figure 3 is a transverse vertical sectional view along the line 3—3 of Figure 1, with the upper laminations of the bolster springs cut away to show the spring-supporting stirrups.
Figure 4:
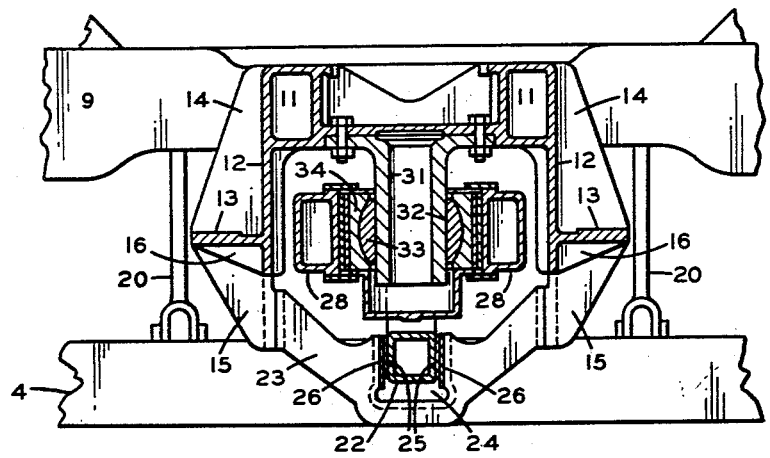
Figure 4 is a fragmentary longitudinal vertical sectional view along the line 4—4 of Figure 1.

The truck includes the usual wheels 1, axles 2, journal boxes 3 rotatably mounted on the ends of axles 2, and longitudinally extending drop equalizers 4 formed with upstanding ends 5 having rebent terminals 6 seated on journal boxes 3. Vertically acting coil springs 7 are seated on equalizers 4 adjacent the upstanding end portions thereof and support a substantially rectangular frame generally indicated at 8, and comprising longitudinally extending wheel pieces 9, transverse end transoms 10, and transverse intermediate transom 11.

Intermediate transom 11 is of shallow box section, its transverse vertical walls being extended downwardly to form a pair of depending vertical webs 12, including motor nose supporting brackets 13, all suitably braced by integral gussets 14, 15, and 16.

Wheel pieces 9 are formed with the usual depending spaced pedestal legs 17 vertically slidably embracing journal boxes 3 in the usual manner, and are each provided intermediate their ends with longitudinally spaced outboard brackets 18 which support, through longitudinally extending pivot members 19, a pair of depending swing hangers 20 which are normally inclined slightly from the vertical in the usual manner to provide the desired resistance to lateral movement. A longitudinally extending semi-elliptic spring 21 is connected to and supported at its ends from hangers 20 by stirrups 20a, each hanger, stirrup, and spring assembly being outboard both of the wheel pieces 9 and equalizers 4.

Intermediate their ends, each of the springs 21 is provided with the usual band 21a, and a transversely extending bolster 22 is rigidly secured at its ends to bands 21a, the end portions of bolster 22 resting on the tops of bands 21a and extending inwardly over the equalizers 4 at substantially this height and then dropping downwardly to form an intermediate depressed center portion so as to clear structure intermediate the sides of the truck. For increasing the rigidity of the connection between each of the bolster end portions and the spring bands, the former are formed with downwardly extending brackets 22a, the outer nearly vertical faces of which are secured in abutting relation to the inner nearly vertical faces of the spring bands.

For preventing movements of the bolster 22 longitudinally of the truck, depending webs 12 of transom 11 support, at their lower ends, a pair of longitudinally extending laterally spaced bracket members 23, each formed with a central transversely extending aperture 24, through which passes bolster 22, the latter being held against movement longitudinally of the truck, while being permitted to move vertically and transversely relative to the truck, by cooperating frictionally engaging wear plates 25 and 26 on opposing transverse vertical faces, respectively, of bolster 22 and members 23.

Bolster 22 is provided at its extreme end portions, immediately above its points of support on spring bands 21a, with horizontal loading pads 27, arcuate in plan and concentric with the center of the bolster.

For supporting the vehicle body underframe U on the truck, a transversely extending tractive effort beam 28 is supported at its ends, through spherical bearings 29, on loading pad shoes 30 which, in turn, are slidably seated on bolster loading pads 27 for movement thereon on arcs concentric with a vertical axis at the center of the truck frame. Underframe U is provided with downwardly extending laterally spaced legs L, which are rigidly secured at their lower ends to the end portions of tractive effort beam 28. It will be noted that truck frame wheel pieces are recessed inwardly laterally of the truck, between the swing hanger brackets 18, to clear underframe legs L both during lateral and swiveling movements of the truck relative to the body.

For transmitting tractive and braking forces from the truck frame 8 through tractive effort beam 28 to the underframe U, while at the same time preventing the transmission of lateral shocks from the truck frame to the underframe, truck frame intermediate transom 11 is provided with a depending centrally disposed cylindrical member 31, which is rotatably and vertically slidably received within a mating cylindrical opening 32 in spherical sleeve 33, the latter being retained within the mating spherical interior of the block 34, which is mounted in a central rectangular recess 35 in tractive effort beam 28 from movement laterally of the vehicle relative to the tractive effort beam. Thus it will be seen that tractive effort beam 28 is capable of rocking, transverse and vertical movements relative to the truck frame as may be required by swinging of the bolster on its hangers and vertical movements of the bolster ends on their supporting springs 21, and of pivotal movements about a vertical axis relative to the bolster, as may be required by swiveling movements of the truck frame and bolster relative to the vehicle underframe and tractive effort beam.

In order to prevent relative lateral displacement between bolster 22 and tractive effort beam 28, while at the same time accommodating relative swiveling movements therebetween as may be permitted by main pivot member 31, a pair of transversely extending links 45, preferably of the type described and illustrated in Reissue Patent No. 21,987, are each flexibly connected at their inner ends to brackets 46 depending from the tractive effort beam adjacent the ends of recess 35, and at their outer ends to brackets 47 on the end portions of bolster 22. To provide adequate vertical clearance between the bolster, links 45, and tractive effort beam 28, the portions of bolster 22 extending over the equalizers are of upwardly open channel section, as distinguished from the intermediate box section portion, and the outward ends of links 45 are received within these channel sections.

Figure 5:
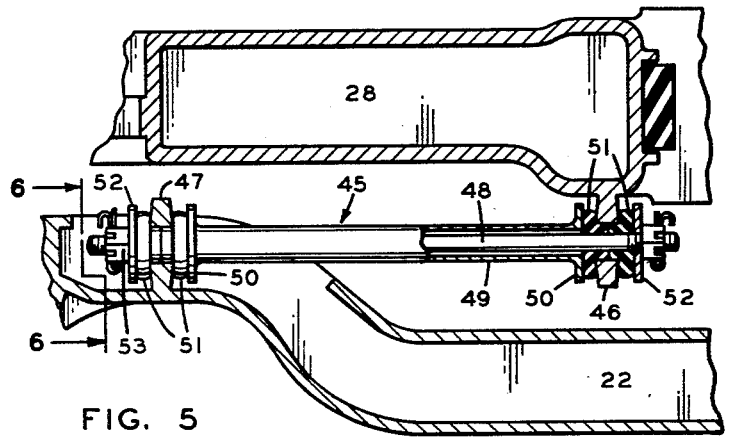
Figure 5 is an enlarged view of a portion of Figure 3.
Figure 6:
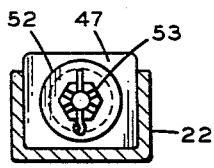
Figure 6 is a vertical sectional view along the line 6—6 of Figure 5.

As best seen in Figure 5, links 45 each include a bolt 48 threaded at each end and passing through holes in tractive effort beam bracket 46 and bolster bracket 47, a tube 49, with its ends flanged as at 50, surrounding bolt 48 and extending between brackets 46 and 47, annular rubber pads 51 compressed between the tube flanges 50 and brackets 46 and 47 respectively, washers 52 and nuts 53 on the threaded end portions of bolt 48, and additional annular rubber pads 51, compressed between washers 52 and brackets 46 and 47 respectively, whereby limited angularity in all directions is permitted between the links and their connecting brackets, and during swiveling movements of the truck about pivot member 31, changes in the distance between tractive effort beam brackets 46 and bolster brackets 47 are accommodated by yieldability of the pads 37 axially of the links.

Operation of the truck is as follows:

Shocks caused by vertical irregularities in the track are transmitted in the usual way through the wheels, axles, and journal boxes to the equalizers, causing the equalizer springs to deflect, thereby raising portions of the equalizers relative to the truck frame, and also causing the bolster supporting springs to deflect with resultant vertical movement of the bolster. Lateral shocks transmitted from the track to the truck frame cause lateral movements of the bolster on its swing hangers. Vertical movements of the equalizers and bolster relative to the frame and to each other, and lateral movements of the bolster relative to the frame and equalizers are accommodated by the clearances, both lateral and vertical, between the arched end portions of the bolster and the equalizers, and further by the positioning of the swing hangers and bolster springs outboard of the truck wheelpieces and well out of vertical alignment with the equalizers. Swiveling and lateral movements of the truck relative to the vehicle body are accommodated by the clearance between the laterally recessed portions of the truck wheelpieces, intermediate the swing hanger brackets, and the body legs L which support the body on the tractive effort beam.

During operation of a vehicle mounted on trucks of this type, tractive and braking forces are transmitted directly from the truck frame to the vehicle body by reason of the engagement between the transverse faces of the pivot block 34 and the tractive effort beam 28. The tractive effort beam 28 and the vehicle body supported upon the beam are free to pivot together relative to the truck frame about central vertical cylindrical member 31. Thus, it will be seen that the bolster is subject to no tractive or braking forces and none are transmitted through it, as in most trucks, to the body frame. The bolster's sole function in this truck is to yieldingly support the tractive effort beam and to transmit movements of the swing hangers to the tractive effort beam. This latter function is effectuated by the transverse links 45, which during operation on tangent track merely serve to prevent lateral movement of the tractive effort beam relative to the bolster, but which on curved track, by reason of the resilient connections 51 between the links and the tractive effort beam and bolster, also permit the tractive effort beam to swivel relative to the bolster. Since the inner connections of the links 45 are displaced laterally of the truck from the pivotal axis about which the tractive effort beam swivels relative to the bolster, during such swiveling movements there is a slight elongation of the distance between the tractive effort beam brackets and the bolster brackets, and the yieldability of the rubber pads axially of the links 45 accommodates this elongation without substantial interference with the swiveling movements, and similarly accommodates the converse foreshortening of the distance between the brackets when the tractive effort beam and bolster return to their normal tangent track position. Because the links only serve as a lateral tie between the tractive effort beam and the bolster, they do not act to transmit to, through, or from the bolster any forces longitudinally of the truck, such as those of traction or braking.

The invention may be modified in various respects as will occur to those skilled in the art and the exclusive use of all modifications as come within the scope of the appended claims is contemplated.

What is claimed is:

1. In a railway vehicle truck, a pair of wheel and axle assemblies, equalizers supported on the ends of said assemblies and extending longitudinally of the truck therebetween, a frame spring-supported on said equalizers, a bolster supported from said frame outwardly of the sides thereof and vertically and laterally movable relative thereto, said bolster having horizontal loading pads on its end portions, a transverse beam extending beneath said frame and being supported at its ends on said bolster loading pads, said bolster being held against movement longitudinally of said truck and said transverse beam being connected to said frame for movement vertically, transversely and about a vertical pivotal axis with respect thereto, said bolster having a depressed center portion and end portions elevated over said equalizers, a pair of transversely extending substantially horizontal links each connected at its inner end to said transverse beam and at its outer end to an elevated end portion of said bolster, the end connections of said links including elements yieldable lengthwise of said links for accommodating changes in effective length of said links caused by relative pivotal movements between said bolster and said beam, the connection of each said link to said beam being spaced a substantial distance from said vertical pivotal axis, said elevated end portions being of channel section, the outer end portions of said links being received within the interior of said channel section.

2. In a railway vehicle truck according to claim 1, said bolster depressed center portion being of box-section, the upper wall thereof being eliminated at the elevated end portions to form said channel sections.

3. In a railway vehicle, a truck comprising wheel and axle assemblies, equalizers supported on the ends of said assemblies and extending longitudinally of the truck therebetween, a frame spring-supported from said equalizers, swing hangers pivotally suspended from the frame outboard of the sides thereof and at points spaced longitudinally thereof, longitudinally extending springs supported at their ends by said swing hangers at substantially the same height as adjacent portions of said equalizers, a transversely extending bolster supported at its ends on said springs and being restrained against movement longitudinally of said frame, the central portion of said bolster being at a lower level than the tops of said equalizers and the portions adjacent said equalizers being arched about said equalizers whereby to clear said equalizers during maximum deflection of said longitudinally extending springs and during maximum lateral displacement of said bolster relative to said frame, a transverse beam extending beneath said frame and supported at its end portions on the ends of said bolster, upstanding legs secured to the end portions of said beam, body framing supported by said upstanding legs, said transverse beam being connected to said frame for movement vertically, transversely, and about a vertical pivotal axis with respect thereto, the sides of said frame being recessed transversely inwardly between said hangers to permit clearance between said frame and said legs during swiveling and lateral movements of said truck relative to the vehicle body, and a pair of aligned links extending transversely of the truck and each connected at its inner end to said transverse beam and at its outer end to an end portion of said bolster, the end connections of said links including elements yieldable lengthwise of said links to accommodate changes in the effective lengths of said links when said bolster and beam are swiveled relative to each other, the inner connections of said links to said beam being spaced a substantial distance from said vertical pivot axis.

4. In a railway vehicle, a truck comprising a pair of wheel and axle assemblies, a frame spring-supported from said assemblies and including longitudinally-extending side members laterally outboard of the wheels and a transversely-extending transom connecting said side members intermediate said assemblies, a pair of swing hangers pivotally suspended from the frame side members laterally outboard thereof and at points symmetrically disposed with respect to the transverse center line of the truck, a leaf spring extending longitudinally between and supported at its ends from said hangers at each side of said truck, a bolster extending transversely between and carried by the leaf springs at each side of said truck, said bolster being formed with upwardly-facing loading pads on its end portions above said springs and outwardly of said frame side members, means retaining said bolster against swiveling about a vertical axis relative to said frame, a beam normally extending transversely of the truck beneath said transom and side members and having at its ends downwardly-facing shoes slidably supported by said upwardly-facing pads, said beam including a central aperture elongated transversely of the truck, a cylindrical pivot member depending from said transom and movably received within said aperture whereby to transmit driving and braking forces lengthwise of said truck from said frame into said beam while accommodating relative movements transversely of the truck therebetween, upright legs carried by said beam laterally inwardly of said springs and outwardly of said frame side members, said frame side members being recessed inwardly transversely of the truck between the mountings of said hangers from said side members to accommodate said legs throughout the range of lateral movement of said beam and legs relative to said frame, and a pair of aligned links extending transversely of the truck and each connected at its inner end to said beam adjacent opposite ends of said aperture and at its outer end to said bolster whereby to prevent relative movements transversely of the truck between said bolster and beam without interfering with swiveling movements therebetween, the connections of said links to said bolster and said beam including resilient elements yieldable lengthwise of said links for accommodating angling of said links relative to said bolster and beam and changes in the effective length of said links required by relative swiveling movements between said bolster and beam.

References Cited in the file of this patent

UNITED STATES PATENTS

| | | |
|---|---|---|
| 2,333,058 | Travilla et al. | Oct. 26, 1943 |
| 2,530,495 | Waldvogel | Nov. 21, 1950 |